United States Patent [19]

McLean

[11] 4,423,595

[45] Jan. 3, 1984

[54] AUGMENTOR RESIDUAL FUEL DRAIN APPARATUS

[75] Inventor: Howard J. McLean, North Palm Beach, Fla.

[73] Assignee: United Technologies Corporation, Hartford, Conn.

[21] Appl. No.: 382,851

[22] Filed: May 27, 1982

[51] Int. Cl.³ .............................................. F02K 3/10
[52] U.S. Cl. ................................... 60/261; 60/39.094; 60/749
[58] Field of Search ...................... 60/39.094, 261, 749

[56] References Cited

U.S. PATENT DOCUMENTS

| | | | |
|---|---|---|---|
| 2,712,218 | 7/1955 | Ritter | 60/39.094 |
| 3,295,325 | 1/1967 | Nelson, Jr. | 60/261 |
| 3,485,045 | 12/1969 | Riecke | 60/749 |
| 4,315,401 | 2/1982 | Beal et al. | 60/261 |
| 4,398,388 | 8/1983 | Langston, Jr. | 60/261 |

Primary Examiner—Louis J. Casaregola
Assistant Examiner—Jeffrey A. Simenauer
Attorney, Agent, or Firm—Stephen E. Revis

[57] ABSTRACT

An augmentor system for a gas turbine engine is drained of residual fuel after augmentor shutdown by means of a drain conduit connected to the augmentor fuel spray apparatus through a valve which opens upon augmentor shutdown. The outlet to the drain conduit is disposed within the flameholder. A pressure differential causes the residual fuel to flow from the spray apparatus into the drain conduit and thereupon into the flameholder, whereupon it is burned.

9 Claims, 5 Drawing Figures

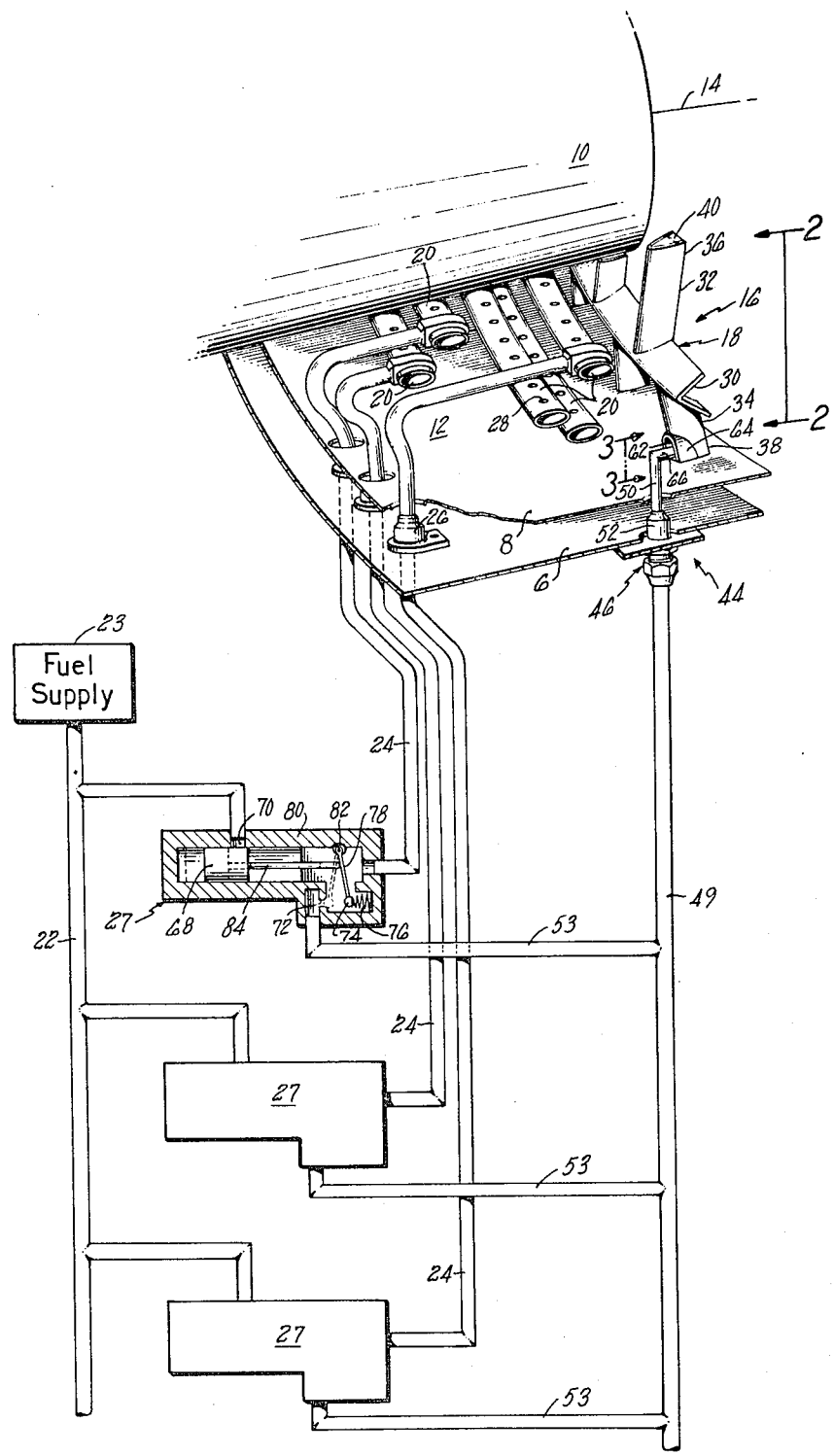

U.S. Patent  Jan. 3, 1984  Sheet 2 of 2  4,423,595
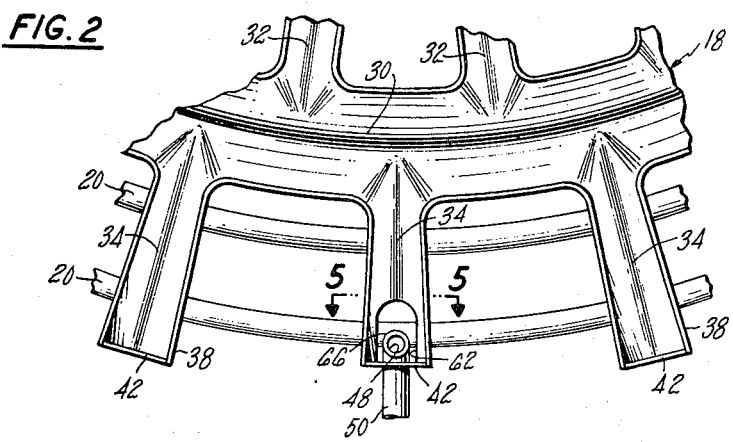
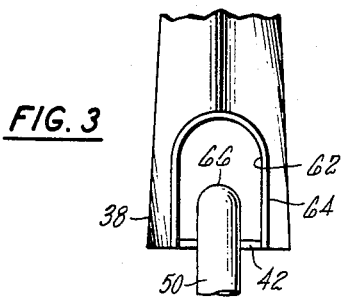
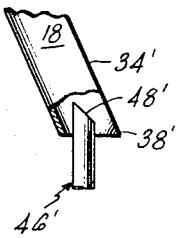
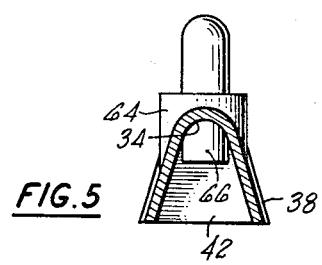

AUGMENTOR RESIDUAL FUEL DRAIN APPARATUS

TECHNICAL FIELD

This invention relates to augmentors for gas turbine engines.

BACKGROUND ART

In one type of augmentor or afterburner system for a gas turbine engine, fuel spray tubes in the form of bars or rings, or other types of fuel spray apparatus are disposed in the exhaust duct downstream of the turbine for spraying fuel into the exhaust duct during augmentor operation. This fuel is burned within the exhaust duct, providing additional thrust. A flameholder disposed downstream of the fuel spray apparatus holds the flame stationary within the duct. U.S. Pat. Nos. 3,295,325 and 4,185,458 show typical augmentor systems for gas turbine engines.

When the augmentor is turned off the residual fuel within the spray apparatus is generally drained and dumped overboard to prevent coking within the apparatus. Dumping this fuel overboard generates a vapor cloud or signature which is undesirable because it helps an enemy locate the aircraft.

DISCLOSURE OF INVENTION

One object of the present invention is an augmentor system which removes residual fuel from augmentor fuel spray apparatus upon shutdown of augmentation.

Another object of the present invention is to remove residual fuel from the fuel spray apparatus of an augmentor system after the augmentor has been shut off, without leaving a vapor cloud.

Accordingly, an augmentor system for a gas turbine engine comprises fuel spray means upstream of a flameholder and fuel drain means comprising a conduit having an outlet within the flameholder and being connected to the spray means, whereupon after shutting the fuel flow to the spray means the residual fuel within the spray means drains through the conduit and is burned at the flameholder.

The fuel may drain due to a pressure drop from the spray means fuel outlets to the drain means outlet within the flameholder or due to a head of liquid fuel at the drain means outlet, or a combination of both. Preferably the outlet for the drain means is at or near the bottom of the engine to maximize the effects of gravity in the draining process.

It is also preferred to have an opening in the flameholder immediately upstream of and axially aligned with the outlet of the drain means whereby exhaust gases passing through the opening help aspirate the fuel exiting from the drain means outlet.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 1 is a simplified, partly schematic perspective view of the afterburner portion of a gas turbine engine.
FIG. 2 is a view taken along the line 2—2 of FIG. 1.
FIG. 3 is a view taken along the line 3—3 of FIG. 1.
FIG. 4 is a side elevation view of a flameholder, partly broken away, showing an alternate embodiment of the present invention.
FIG. 5 is a view taken along the line 5—5 of FIG. 2.

BEST MODE FOR CARRYING OUT THE INVENTION

With reference to FIG. 1, gas turbine engine casing 6 surrounds a turbine exhaust duct 8 and the engine tail cone 10. The duct 8 and tail cone 10 define an annular turbine exhaust gas flow path 12 about the engine centerline 14.

An exemplary embodiment of an augmentor system according to the present invention is generally represented by the numeral 16. The augmentor system 16 comprises a flameholder 18 and annular fuel spray tubes 20 (there are five in this embodiment) disposed upstream thereof within the gas flow path 12. Although in this embodiment the spray tubes are annular rings, they would just as well be radially extending bars, or the like, or a combination of bars and rings. The augmentor system also includes an augmentor fuel supply line 22 which acts as a manifold to distribute fuel from a suitable supply 23 to a plurality of fuel tubes 24. Each tube 24 carries the fuel to one of the spray rings 20. The fuel tubes 24 are secured to the casing 6 by means of suitable fittings 26. The flow of fuel to each spray ring 20 through each fuel tube 24 is controlled by a separate valve 27.

The spray rings 20 each include a plurality of circumferentially spaced apart nozzle-like openings 28 through which fuel is sprayed radially inwardly during augmentation. These openings, which can be of fixed size or variable area, may be of any design and construction known in the art and are not considered a part of the present invention. For purposes of simplicity, in FIG. 1 the openings 28 are shown merely as holes in the spray rings 20.

The flameholder 18 may also be constructed in accordance with designs and principles well known in the art except for a local modification to be described hereinafter in connection with the present invention. As can best be seen in FIGS. 1 and 2, the flameholder of this embodiment comprises an annular V-shaped trough 30 with a plurality of circumferentially spaced apart V-shaped troughs 32, 34 extending radially inwardly and outwardly therefrom, respectively. The troughs 30, 32, 34 all face toward the downstream direction; and the radially innermost ends 36 of the troughs 32 and the radially outermost ends 38 of the troughs 34 include end caps 40, 42, respectively, which close the ends of the troughs to prevent the flame from propagating radially and damaging the engine tail cone 10 or duct 8.

In accordance with the present invention, the augmentor system 16 also includes a residual fuel drain generally represented by the numeral 44. The fuel drain 44 is comprised of a drain conduit 46 comprising an outer portion 49 external of the casing 6 and an inner portion 50 inside the case 6. The inner portion 50 includes the outlet 48 of the conduit 46. The outer and inner portions 49, 50 are connected together and to the casing 6 by means of a fitting 52 bolted to the casing. The drain conduit 46 communicates with the individual fuel tubes 24 and spray rings 20 through the valves 27 and connector lines 53.

Referring to FIGS. 2, 3 and 5, the radially extending trough 34 located approximately at the bottom of the gas flow path 12 has a U-shaped opening 62 through the trough's V-shaped wall adjacent the end cap 42. A U-shaped brace 64 is welded around the opening 62 for reinforcement. The inner portion 50 of the conduit 46 extends radially inwardly from the casing 6 and includes an end portion 66 which extends downstream into the trough 34 through the opening 62 such that the outlet 48 of the conduit 46 is within the trough 34. The opening 62 should be large enough to provide sufficient space around the end portion 66 to accommodate relative movement between the end portion 66 and the flameholder 18 due to thermal expansions and contractions.

The present invention operates as follows: To begin afterburning, the fuel flow to each spray ring 20 is initiated by sequentially moving the pistons 68 of the valves 27 to the left, whereby fuel inlet ports 70 of the valves 27 are opened. While the inlet ports 70 are open (dotted position of the valve 27), a drain outlet port 72 of the valve 27 is kept closed by means of plug 74 which is biased against the outlet port 72 by a spring 76. The plug 74 is attached to the end of a rod 78 which is hinged to the valve wall 80 as at 82. In this drain closed position the fuel in the supply conduit 22 fills one or more of the tubes 24 and spray rings 20 and is sprayed into the exhaust duct 12 through the openings 28 in the rings.

To shut off the afterburner or one or more of the spray rings, the pistons 68 are moved to the right until the fuel inlet ports 70 are closed. Upon closing of an inlet port 70, continued movement of the piston to the right causes a rod 84 attached to the piston to open the drain outlet port 72 by rotating the hinged rod 78 counterclockwise. This provides direct communication between the drain conduit 46, the fuel tube 24 associated with the particular valve 27, and the spray ring 20 associated with that particular fuel tube 24. Due to the pressure drop across the flameholder 18, the gas pressure at the openings 28 is several psi higher than the gas pressure at the outlet 48 of the drain conduit 46. Thus, residual liquid fuel in the fuel tubes 24 and within the spray rings 20 is forced into the drain conduit 46 and is sprayed from the outlet 48 into the gas flow path 12 and burned. Turbine exhaust gases passing through the opening 62 in the flameholder 18 and which is axially aligned with and upstream of the outlet 48, help aspirate and mix the residual fuel as it leaves the conduit 46 thereby facilitating burning. Other means may also be used to help mix the fuel with the hot gas stream, such as by incorporating swirler vanes into the end portion 66 of the conduit 46.

FIG. 4 shows an alternate embodiment of the present invention. Components which are analogous to those shown in FIG. 1 have been given the same, but primed reference numerals. In this alternate embodiment the trough 34' of the flameholder 18 into which the residual fuel is to be sprayed does not have an end cap 42. The drain conduit 46' extends radially into the trough 34' through its open end 38'. Although not shown here, it may be advantageous to provide an opening in the trough 34' upstream of and axially aligned with the drain conduit outlet 48' to help aspirate the fuel exiting from the outlet 48'. Because the flame may propagate radially outwardly through the open end 38' of the trough 34' this embodiment may not be suitable for some applications.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a gas turbine engine having an axis and including means defining a turbine exhaust gas flow path, an augmentor system comprising:
   fuel spray means disposed in said flow path;
   fuel supply means in fluid communication with said spray means for supplying fuel thereto;
   a flameholder downstream of said spray means;
   fuel drain means including drain conduit means having outlet means within said flameholder; and
   valve means in operable relationship with said drain conduit means and with said fuel supply means said valve means comprising means for shutting off the flow of fuel to said spray means and for providing fluid communication between said spray means and said drain conduit means upon the shutting off of fuel flow to said spray means for draining residual fuel from said spray means into said flameholder.

2. The augmentor system according to claim 1 wherein said outlet means is located at the bottom of said gas flow path to maximize the gravity head of residual fuel at said outlet means during draining.

3. The augmentor system according to claims 1 or 2 wherein said flameholder includes wall means defining a downstream facing trough, said outlet means being disposed in said trough.

4. The augmentor system according to claim 3 wherein said wall means has an opening therein upstream of and axially aligned with said outlet means.

5. The augmentor system according to claim 3 wherein said spray means includes a plurality of spray tubes disposed around said engine axis and a plurality of fuel tubes connected thereto and to said fuel supply means for carrying fuel from said fuel supply means to said spray tubes.

6. The augmentor system according to claim 3 wherein said trough is a radially extending trough having an open, radially outermost end, and said conduit means includes a tube extending radially inwardly from said exhaust duct means into said trough through said trough open end.

7. The augmentor system according to claim 3 wherein said wall means includes a radially extending portion defining a radially extending trough having a closed, radially outermost end, said radially extending portion having an opening therein, wherein said conduit means includes a tube extending radially inwardly from said exhaust duct means and having an end portion extending in the downstream direction into said trough through said opening.

8. The augmentor system according to claim 5 wherein said valve means includes a separate valve in operable relationship with a corresponding one of said fuel tubes and with said drain conduit means for individually controlling fuel flow to each of said spray tubes.

9. The augmentor system according to claim 5 wherein said spray tubes are annular rings.

* * * * *